(12) United States Patent
Matsumoto et al.

(10) Patent No.: US 12,415,882 B2
(45) Date of Patent: Sep. 16, 2025

(54) POLYCARBODIIMIDE COMPOUND, AQUEOUS RESIN COMPOSITION AND FOOD PACKAGING CONTAINER

(71) Applicant: NISSHINBO CHEMICAL INC., Tokyo (JP)

(72) Inventors: Nobuyuki Matsumoto, Chiba (JP); Shunta Nakajima, Chiba (JP); Takahiko Itoh, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 751 days.

(21) Appl. No.: 17/771,752

(22) PCT Filed: Oct. 19, 2020

(86) PCT No.: PCT/JP2020/039255
§ 371 (c)(1),
(2) Date: Apr. 25, 2022

(87) PCT Pub. No.: WO2021/085215
PCT Pub. Date: May 6, 2021

(65) Prior Publication Data
US 2022/0380513 A1 Dec. 1, 2022

(30) Foreign Application Priority Data
Oct. 31, 2019 (JP) .................... 2019-199066

(51) Int. Cl.
| | | |
|---|---|---|
| *C08G 18/16* | (2006.01) | |
| *C08G 18/09* | (2006.01) | |
| *C08G 18/48* | (2006.01) | |
| *C08G 18/75* | (2006.01) | |
| *C09D 175/12* | (2006.01) | |

(52) U.S. Cl.
CPC ......... *C08G 18/095* (2013.01); *C08G 18/168* (2013.01); *C08G 18/4825* (2013.01); *C08G 18/4833* (2013.01); *C08G 18/755* (2013.01); *C08G 18/758* (2013.01); *C09D 175/12* (2013.01); *C08G 2150/00* (2013.01); *C08G 2170/00* (2013.01)

(58) Field of Classification Search
USPC ....................................................... 528/310
See application file for complete search history.

(56) References Cited

U.S. PATENT DOCUMENTS

| | | | |
|---|---|---|---|
| 2006/0106189 A1 | 5/2006 | Hesselmans et al. | |
| 2009/0246393 A1 | 10/2009 | Ambrose et al. | |
| 2013/0122229 A1 | 5/2013 | Ambrose et al. | |
| 2020/0017628 A1 | 1/2020 | Banno et al. | |
| 2022/0153912 A1 | 5/2022 | Matsumoto et al. | |

FOREIGN PATENT DOCUMENTS

| | | | | |
|---|---|---|---|---|
| JP | 10-60272 A | 3/1998 | | |
| JP | 2002-363250 A | 12/2002 | | |
| JP | 2007-521360 A | 8/2007 | | |
| JP | 2014-47225 A | 3/2014 | | |
| WO | WO-2018123362 A1 * | 7/2018 | ......... | C08G 18/0823 |
| WO | WO 2020/196055 A1 | 10/2020 | | |

OTHER PUBLICATIONS

WO-2018123362-A1 Machine Translation (Year: 2018).*
Extended European Search Report for European Application No. 20881625.6, dated Oct. 9, 2023.
International Search Report for PCT/JP2020/039255 mailed on Jan. 12, 2021.

* cited by examiner

*Primary Examiner* — Terressa Boykin
(74) *Attorney, Agent, or Firm* — Birch, Stewart, Kolasch & Birch, LLP

(57) ABSTRACT

Provided are a polycarbodiimide compound that enables an aqueous resin composition capable of forming a coating (layer) having water resistance and adhesion that can withstand use for food packaging to be obtained, an aqueous resin composition containing the polycarbodiimide compound, and a food packaging having a layer formed of the aqueous resin composition. A polycarbodiimide compound (A) represented by formula (1) below,

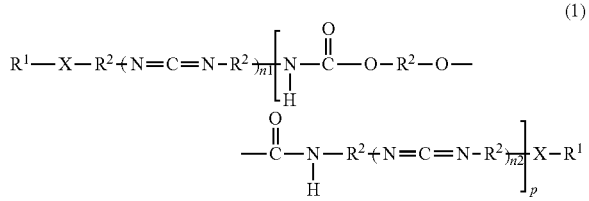

(1)

wherein $R^1$ represents a residue obtained by removing a functional group capable of reacting with isocyanate from a hydrophilic compound having the functional group capable of reacting with isocyanate, $R^2$ represents a divalent residue obtained by removing an isocyanate group from an aliphatic diisocyanate compound, and $R^3$ represents a divalent residue obtained by removing a hydroxyl group from a glycol compound having 2 or 3 carbon atoms; X represents a group that is formed by reaction between the hydrophilic compound and the aliphatic diisocyanate compound; n1 represents a number of 1 to 10, n2 represents a number of 1 to 10, and p represents a number of 2 to 4; and a plurality of $R^1$ and $R^2$ each may be the same or different.

8 Claims, 1 Drawing Sheet

[Fig. 1]
[Fig. 2]
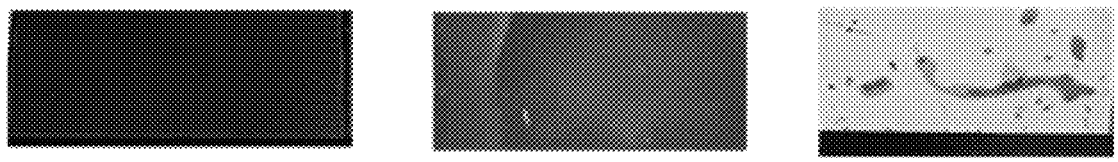

POLYCARBODIIMIDE COMPOUND, AQUEOUS RESIN COMPOSITION AND FOOD PACKAGING CONTAINER

TECHNICAL FIELD

The present invention relates to a polycarbodiimide compound, an aqueous resin composition, and a food packaging container.

BACKGROUND ART

Conventionally, in order to improve various physical properties such as strength, water resistance, and durability of an aqueous resin coating, a method of using a crosslinking agent such as a carbodiimide compound that can react with a functional group (e.g., a carboxyl group) of the aqueous resin to form a crosslinked structure in combination has been adopted (see PTLs 1 and 2, for example).

The aqueous resin coating has been used in many fields such as paints, inks, fiber treatment agents, adhesives, and coating agents but has not been used for food packaging.

Thus, since the aqueous resin coating has not been used for food packaging, water resistance and adhesion (for example, water resistance when immersed in high-temperature water and adhesion after immersion) have not reached a level that can withstand use for food packaging.

CITATION LIST

Patent Literature

PTL1: JP 2014-047225 A
PTL2: JP 2002-363250 A

SUMMARY OF INVENTION

Technical Problem

Under such a situation, there has been an increasing demand for using an aqueous resin coating for food packaging, but there has been a problem that the water resistance and the adhesion have not reached a level that can withstand the use for food packaging.

The present invention has been devised in view of such an actual situation, and an object thereof is to provide a polycarbodiimide compound that enables an aqueous resin composition capable of forming a coating (layer) having water resistance and adhesion that can withstand use for food packaging to be obtained, an aqueous resin composition containing the polycarbodiimide compound, and a food packaging container having a layer formed of the aqueous resin composition.

Solution to Problem

As a result of diligent studies in order to solve the above problems, the inventors have found that the problems are solved by using a polycarbodiimide compound (A) having a specific structure as a crosslinking agent. The present invention has been accomplished based on such a finding.

That is, the present invention provides [1] to [12] below.

[1] A polycarbodiimide compound (A) represented by formula (1) below:

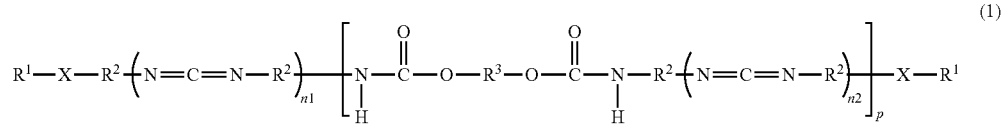

wherein $R^1$ represents a residue obtained by removing a functional group capable of reacting with isocyanate from a hydrophilic compound having the functional group capable of reacting with isocyanate, $R^2$ represents a divalent residue obtained by removing an isocyanate group from an aliphatic diisocyanate compound, and $R^3$ represents a divalent residue obtained by removing a hydroxyl group from a glycol compound having 2 or 3 carbon atoms; X represents a group that is formed by reaction between the hydrophilic compound and the aliphatic diisocyanate compound; n1 represents a number of 1 to 10, n2 represents a number of 1 to 10, and p represents a number of 2 to 4; and a plurality of $R^1$ and $R^2$ each may be the same or different.

[2] The polycarbodiimide compound (A) according to [1] above, wherein the glycol compound is at least any one of ethylene glycol and propylene glycol.

[3] The polycarbodiimide compound (A) according to [1] or [2] above, wherein the diisocyanate compound is at least any one of dicyclohexylmethane-4,4'-diisocyanate and isophorone diisocyanate.

[4] The polycarbodiimide compound (A) according to any one of [1] to [3] above, having a carbodiimide equivalent of 640 or less.

[5] An aqueous resin composition comprising the polycarbodiimide compound (A) according to any one of [1] to [4] above and an aqueous resin.

[6] The aqueous resin composition according to [5] above, wherein the aqueous resin is at least one selected from the group consisting of an aqueous polyurethane resin, an acrylic resin, a polyester resin, and a rubber latex resin.

[7] The aqueous resin composition according to [6] above, wherein the aqueous resin is at least one selected from the group consisting of an aqueous polyurethane resin, an acrylic resin, and a polyester resin.

[8] The aqueous resin composition according to any one of [5] to [7] above, further comprising at least one selected from the group consisting of water and a hydrophilic solvent.

[9] The aqueous resin composition according to any one of [5] to [8] above, wherein the aqueous resin contains a carboxyl group, and an equivalent ratio of the carbodiimide group of the polycarbodiimide compound (A) with respect to the carboxyl group of the aqueous resin is 0.1 to 2.0.

[10] A food packaging container comprising a layer formed of the aqueous resin composition according to any one of [5] to [9].
[11] The food packaging container according to [10] above, comprising the layer as an uppermost layer.
[12] The food packaging container according to [10] above, comprising the layer as an adhesive layer.

Advantageous Effects of Invention

The present invention can provide a polycarbodiimide compound that enables an aqueous resin composition capable of forming a coating (layer) having water resistance and adhesion that can withstand use for food packaging to be obtained, an aqueous resin composition comprising the polycarbodiimide compound, and a food packaging container comprising a layer formed of the aqueous resin composition.

BRIEF DESCRIPTION OF DRAWINGS

FIG. 1 is a diagram illustrating evaluation criteria for evaluation of water resistance in Examples.
FIG. 2 is a diagram illustrating evaluation criteria for evaluation of adhesion in Examples.

DESCRIPTION OF EMBODIMENTS

[Polycarbodiimide Compound (A)]

The polycarbodiimide compound (A) of the present invention is characterized by being represented by formula (1) below. The polycarbodiimide compound (A) of the present invention forms a crosslinked structure together with the aqueous resin to be described later and improves water resistance, adhesion, and the like of the aqueous resin coating, so as to withstand use for food packaging.

having two secondary isocyanate groups), isophorone diisocyanate (aliphatic diisocyanate compound having one primary isocyanate group and one secondary isocyanate group), dicyclohexylmethane-4,4'-diisocyanate (aliphatic diisocyanate compound having two secondary isocyanate groups), methylcyclohexane diisocyanate (1-methylcyclohexane-2,4-diyldiisocyanate) (aliphatic diisocyanate compound having two secondary isocyanate groups), and 2,5(2,6)-bis(isocyanatomethyl)bicyclo[2.2.1]heptane (aliphatic diisocyanate compound having two primary isocyanate groups).

Among these, dicyclohexylmethane-4,4'-diisocyanate and isophorone diisocyanate are preferable in view of ease of synthesis of the polycarbodiimide compound and the storage stability of the polycarbodiimide compound synthesized, and dicyclohexylmethane-4,4'-diisocyanate is more preferable in view of the storage stability of the polycarbodiimide compound synthesized.

An aliphatic diisocyanate compound having only a secondary or higher isocyanate group is more preferable than an aliphatic diisocyanate compound having a primary isocyanate group.

Further, isophorone diisocyanate having not only a primary isocyanate group but also a secondary isocyanate group is preferably mentioned among aliphatic diisocyanate compounds having a primary isocyanate group.

In this description, the "primary isocyanate group" refers to an isocyanate group in which the carbon atom to which the isocyanate group is directly connected is a primary carbon atom, and the "secondary isocyanate group" refers to an isocyanate group in which the carbon atom to which the isocyanate group is directly connected is a secondary carbon atom.

<$R^1$>

In formula (1) above, $R^1$ represents a residue obtained by removing a functional group capable of reacting with iso-

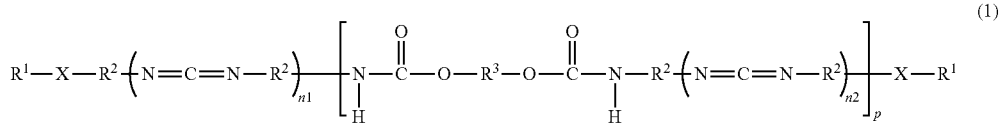

(1)

wherein $R^1$ represents a residue obtained by removing a functional group capable of reacting with isocyanate from a hydrophilic compound having the functional group capable of reacting with isocyanate, $R^2$ represents a divalent residue obtained by removing an isocyanate group from an aliphatic diisocyanate compound, and $R^3$ represents a divalent residue obtained by removing a hydroxyl group from a glycol compound having 2 or 3 carbon atoms; X represents a group that is formed by reaction between the hydrophilic compound and the aliphatic diisocyanate compound; n1 represents a number of 1 to 10, n2 represents a number of 1 to 10, and p represents a number of 2 to 4; and a plurality of $R^1$ and $R^2$ each may be the same or different.

<$R^2$>

In formula (1) above, $R^2$ represents a divalent residue obtained by removing an isocyanate group from an aliphatic diisocyanate compound. Here, the aliphatic diisocyanate compound includes an alicyclic diisocyanate compound.

Specific examples of the aliphatic diisocyanate compound include hexamethylene diisocyanate (aliphatic diisocyanate compound having two primary isocyanate groups), cyclohexane-1,4-diisocyanate (aliphatic diisocyanate compound cyanate from a hydrophilic compound having the functional group capable of reacting with isocyanate. The hydrophilic compound is preferably at least one selected from the group consisting of compounds represented by formulas (2), (3), (4), and (5) below, more preferably at least one selected from the group consisting of compounds represented by formulas (2) and (3) below, further preferably a compound represented by formula (2) below, particularly preferably at least one selected from the group consisting of polyethylene glycol monomethyl ether, polyethylene glycol mono-2-ethylhexyl ether, and polyethylene glycol monolauryl ether, for improving the solubility or dispersibility of the polycarbodiimide compound (A) in water or a hydrophilic solvent.

$$R^4O-(CH_2-CHR^5-O)_m-H \qquad (2)$$

In the formula, $R^4$ is an alkyl group having 1 to 12 carbon atoms (preferably, an alkyl group having 1 to 4 carbon atoms), and $R^5$ is a hydrogen atom or a methyl group;
m is an integer of 4 to 30.

Examples of the alkyl group having 1 to 4 carbon atoms include a methyl group, an ethyl group, a n-propyl group, an isopropyl group, a n-butyl group, a sec-butyl group, an isobutyl group, and a t-butyl group.

$R^4$ is preferably a methyl group, and $R^5$ is preferably a hydrogen atom.

m is an integer of 4 to 30, preferably an integer of 4 to 22, more preferably an integer of 8 to 15, for improving the affinity between the polycarbodiimide compound (A) and a carboxyl group-containing aqueous resin.

$$(R^6)_2-N-R^7-OH \quad (3)$$

In the formula, $R^6$ is an alkyl group having 1 to 6 carbon atoms, $R^7$ is an alkylene group having 1 to 10 carbon atoms, or a polyoxyalkylene group.

Examples of the alkyl group having 1 to 6 carbon atoms represented by $R^6$ include a methyl group, an ethyl group, a n-propyl group, an isopropyl group, a n-butyl group, a sec-butyl group, an isobutyl group, a t-butyl group, a n-pentyl group, a n-hexyl group, and a cyclohexyl group. Among them, a methyl group, an ethyl group, a propyl group, an isopropyl group, a n-butyl group, a sec-butyl group, an isobutyl group, and a t-butyl group are preferable.

Examples of the alkylene group having 1 to 10 carbon atoms represented by $R^7$ include a methylene group, an ethylene group, a propylene group, a tetramethylene group, a pentamethylene group, a hexamethylene group, a heptamethylene group, an octamethylene group, a nonamethylene group, and a decamethylene group. The hydrogen atom of the alkylene group is optionally substituted with a monovalent hydrocarbon group such as a methyl group.

$R^7$ is preferably an ethylene group, a propylene group, a tetramethylene group, or a pentamethylene group.

$$(R^8)_2-N-R^9-NH_2 \quad (4)$$

In the formula, $R^8$ is an alkyl group having 1 to 6 carbon atoms, and RP is an alkylene group having 1 to 10 carbon atoms or a polyoxyalkylene group.

Examples of the alkyl group having 1 to 6 carbon atoms represented by $R^8$ are the same as those described above for $R^6$. Among them, a methyl group, an ethyl group, a propyl group, an isopropyl group, a n-butyl group, a sec-butyl group, an isobutyl group, and a t-butyl group are preferable.

Examples of the alkylene group having 1 to 10 carbon atoms represented by $R^9$ are the same as those described above for $R^7$.

$R^9$ is preferably an ethylene group, a propylene group, a tetramethylene group, or a pentamethylene group.

$$HO-R^{10}-SO_3M \quad (5)$$

In the formula, $R^{10}$ is an alkylene group having 1 to 10 carbon atoms, and M is an alkali metal such as Na and K.

Examples of the alkylene group having 1 to 10 carbon atoms represented by $R^{10}$ are the same as those described above for $R^7$. Among them, a methylene group and an ethylene group are preferable.

<$R^3$>

In formula (1) above, and $R^3$ represents a divalent residue obtained by removing a hydroxyl group from a glycol compound having 2 or 3 carbon atoms. The glycol compound having 2 or 3 carbon atoms is preferably at least any one of ethylene glycol and propylene glycol.

In the glycol compound, when the carbon number is 1, it is difficult to obtain industrially and it is not suitable for actual use. On the contrary, when the carbon number is more than 3 and is an integer of 4 or more, the glycol component occupies a large amount in the molecule, resulting in a decrease in concentration of the carbodiimide to be reacted.

In formula (1) above, X represents a group that is formed by reaction between the hydrophilic compound and the aliphatic diisocyanate compound. For example, in the case where the hydrophilic compound is represented by formula (2), (3), or (5) above, X is a group represented by formula (6) below, and in the case where the hydrophilic compound is represented by formula (4) above, X is a group represented by formula (7) below.

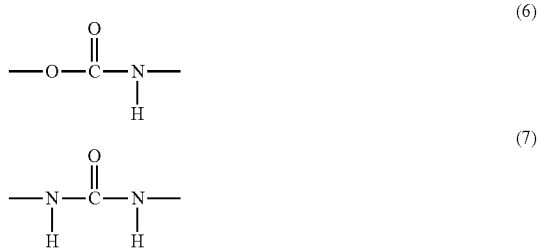

<n1>

In formula (1) above, n1 is not particularly limited as long as it is a number of 1 to 10 but is preferably a number of 1 to 5, more preferably a number of 1 to 4, particularly preferably a number of 1 to 3. When n1 in formula (1) is over 10, the hydrophilicity of the polycarbodiimide compound (A) decreases, so that its dispersion in water becomes difficult, and its use as an aqueous crosslinking agent becomes difficult.

<n2>

In the formula (1) above, n2 is not particularly limited as long as it is a number of 1 to 10 and is preferably a number of 1 to 5, more preferably a number of 1 to 4, particularly preferably a number of 1 to 3. When n2 in the formula (1) is over 10, the hydrophilicity of the polycarbodiimide compound (A) decreases, so that its dispersion in water becomes difficult, and its use as an aqueous crosslinking agent becomes difficult.

<p>

In formula (1) above, p is not particularly limited as long as it is 2 to 4 and is preferably 2 to 3, more preferably 2. When p in formula (1) is less than 2, the water resistance and PET adhesion decrease, and when it is over 4, the hydrophilicity of the polycarbodiimide compound (A) decreases, so that its water dispersion becomes difficult, and its use as an aqueous crosslinking agent becomes difficult.

The polycarbodiimide compound (A) is preferably dissolved or dispersed in at least one selected from the group consisting of water and a hydrophilic solvent for use.

The carbodiimide (NCN) equivalent of the polycarbodiimide compound (A) is not particularly limited but is preferably 640 or less, more preferably 600 or less, further preferably 550 or less. Here, the "carbodiimide (NCN) equivalent" in this description means "the molecular weight of the polycarbodiimide compound (A)/the number of "carbodiimide (N═C═N) structures" present in one molecule of the polycarbodiimide compound (A)" and is more preferably smaller for improving the crosslinkability of the polycarbodiimide compound.

<Method for Producing Polycarbodiimide Compound (A)>

The method for producing the polycarbodiimide compound (A) of the present invention is characterized by comprising step (a) and step (b) below.

Step (a): a step of carbodiimidizing an aliphatic diisocyanate compound in the presence of a catalyst to obtain a polycarbodiimide (Y) having isocyanate groups at both ends Step (b): a step of reacting a hydrophilic compound having a functional group capable of reacting with 0.33 equivalent or less of isocyanate to the total amount of the isocyanate groups at both ends of the polycarbodiimide (Y), the polycarbodiimide (Y), and a glycol compound having 2 or 3 carbon atoms In the present invention, the glycol compound functions as a chain extender of the polycarbodiimide (Y).

<<Step (a)>>

In step (a), the aliphatic diisocyanate compound is carbodiimidized in the presence of a catalyst, to obtain the polycarbodiimide (Y) having isocyanate groups at both ends.

As the aliphatic diisocyanate compound, the compounds mentioned in the section [Polycarbodiimide compound (A)] can be used.

Examples of the catalyst to be used for carbodiimidization can include phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, and 3-phosphorene isomers thereof. Among these, 3-methyl-1-phenyl-2-phosphorene-1-oxide is preferable in view of reactivity.

The amount of the catalyst in the method for producing the polycarbodiimide compound (A) to be used is generally 0.01 to 2.0 parts by mass with respect to 100 parts by mass of the diisocyanate compound to be used for carbodiimidization.

The carbodiimidization can be performed in the absence or presence of a solvent. Examples of the solvent that can be used include alicyclic ethers such as tetrahydroxyfuran, 1,3-dioxane, and dioxolan: aromatic hydrocarbons such as benzene, toluene, xylene, and ethyl benzene: halogenated hydrocarbons such as chlorobenzene, dichlorobenzene, trichlorobenzene, perchloroethylene, trichloroethane, and dichloroethane, and cyclohexanone. These may be used singly or in combination of two or more.

In the case of performing the reaction in a solvent, the concentration of the diisocyanate compound is preferably 5 to 55 mass %, more preferably 5 to 20 mass %.

The conditions for the carbodiimidization are not specifically limited, but the carbodiimidization is performed at preferably 40 to 250° C., more preferably 80 to 195° C., for preferably 1 to 30 hours, more preferably 5 to 25 hours. Further, in the case of performing the reaction in a solvent, the temperature is preferably from 40° C. to the boiling point of the solvent.

The polymerization degrees n1 and n2 of the polycarbodiimide compound (A) each are not particularly limited as long as it is a number of 1 to 10 but is preferably a number of 1 to 5, more preferably a number of 1 to 4, particularly preferably a number of 1 to 3, for facilitating the dissolution or dispersion of the polycarbodiimide compound (A) in water or a hydrophilic solvent.

<<Step (b)>>

In step (b), the hydrophilic compound having a functional group capable of reacting with 0.33 equivalent or less of isocyanate to the total amount of the isocyanate groups at both ends of the polycarbodiimide (Y), the polycarbodiimide (Y), and the glycol compound having 2 or 3 carbon atoms are reacted.

The method for reacting the polycarbodiimide (Y) obtained in step (a), the hydrophilic compound, and the glycol compound is not specifically limited, and examples thereof include (i) a method of reacting the polycarbodiimide (Y) with a specific amount of the hydrophilic compound and then reacting a polycarbodiimide (Z) having a hydrophilic group at an end obtained with the glycol compound having 2 or 3 carbon atoms, (ii) a method of reacting the polycarbodiimide (Y) with the glycol compound having 2 or 3 carbon atoms and then reacting the hydrophilic compound with the compound obtained, and (iii) a method of reacting the polycarbodiimide (Y), the hydrophilic compound, and the glycol compound having 2 or 3 carbon atoms at the same time. Among them, method (i) is preferable for controlling the local reaction and the increase in molecular weight.

Method (i) specifically includes step (b1) of reacting the polycarbodiimide (Y) obtained in step (a) with the hydrophilic compound having a functional group capable of reacting 0.33 equivalent or less of isocyanate to the total amount of the isocyanate groups at both ends of the polycarbodiimide (Y) to obtain the polycarbodiimide (Z) having a hydrophilic group at an end and step (b2) of reacting the polycarbodiimide (Z) obtained in step (b1) above with the glycol compound having 2 or 3 carbon atoms to extend the chain of the polycarbodiimide (Z) and obtain the polycarbodiimide compound (A).

In step (b1), the polycarbodiimide (Y) obtained in step (a) is reacted with the hydrophilic compound having a functional group capable of reacting 0.33 equivalent or less of isocyanate to the total amount of the isocyanate groups at both ends of the polycarbodiimide (Y), to introduce a hydrophilic group into an end of the polycarbodiimide (Y).

As the hydrophilic compound, the hydrophilic compounds mentioned in the section [Polycarbodiimide compound (A)] can be used.

The amount of the hydrophilic compound to be used is preferably 0.2 to 0.33 equivalent, more preferably 0.25 to 0.33 equivalent, to the functional group equivalent of the total amount of the isocyanate groups at both ends of the polycarbodiimide (Y). The amount of 0.33 equivalent or less enables side reactions to be controlled and the polycarbodiimide compound (A) as desired to be obtained in step (b2), which will be described below.

The conditions for the reaction are not specifically limited, but it is preferable that the temperature is kept by heating at preferably 50 to 200° C., more preferably 100 to 180° C., followed by addition of the hydrophilic compound, and the reaction is further performed at about 80 to 200° C. for about 0.5 to 5 hours.

In step (b2), the polycarbodiimide (Z) obtained in step (b1) is reacted with the glycol compound having 2 or 3 carbon atoms, to extend the chain of the polycarbodiimide (Z).

As the glycol compound having 2 or 3 carbon atoms, the glycol compounds having 2 or 3 carbon atoms mentioned in the section [Polycarbodiimide compound (A)] can be used.

The amount of the glycol compound having 2 or 3 carbon atoms to be used is preferably 0.67 to 0.8 equivalent, more preferably 0.67 to 0.75 equivalent, to the functional group equivalent of the total amount of the isocyanate groups at both ends of the polycarbodiimide (Y) obtained in step (a). Such a range enables unreacted materials of the polycarbodiimide (Y) obtained in step (b1) and unreacted materials of the glycol compound having 2 or 3 carbon atoms to be suppressed and the polycarbodiimide compound (A) as desired to be obtained.

The conditions for the reaction are not specifically limited, but the reaction temperature is preferably about 80 to 200° C., and the reaction time is preferably about 0.5 to 5 hours.

Further, the chain extension unit p of the polycarbodiimide compound (A) is not particularly limited, as long as it is 2 to 4, but is preferably 2 to 3, more preferably 2, for facilitating the dissolution or dispersion of the polycarbodiimide compound (A) in water or a hydrophilic solvent.

The aqueous resin composition to be described later can form a coating (layer) having water resistance and adhesion that can withstand use for food packaging by containing the polycarbodiimide compound (A) thus obtained.

[Aqueous Resin Composition]

The aqueous resin composition of the present invention is characterized by comprising the polycarbodiimide compound (A) represented by formula (1) of the present invention and an aqueous resin.

<Aqueous Resin>

The aqueous resin to be used in the present invention is not specifically limited but preferably has a carboxyl group. Examples of the aqueous resin include an aqueous polyurethane resin, an acrylic resin, a polyester resin, and a rubber latex resin, and these resins can be preferably used. Among them, an aqueous polyurethane resin, an acrylic resin, and a polyester resin are preferable for exerting the effects of the present invention.

These resins may be used singly or in combination of two or more.

<<Aqueous Polyurethane Resin>>

Examples of the aqueous polyurethane resin include a resin obtained by reacting a carboxyl group-containing urethane prepolymer to be obtained from polyols, carboxyl group-containing polyols, and polyisocyanate compounds with a neutralizer and a chain extender in the presence of an organic solvent or water, followed by desolvating under reduced pressure.

—Polyols—

Examples of the polyols as a raw material of the aqueous polyurethane resin include polymers or copolymers of low-molecular weight polyols, specifically, polyether polyol, polyester polyol, polycarbonate polyol, polyether ester polyol, polycarbonate ester polyol, and polycarbonate ether polyol. These may be used singly or in combination of two or more.

—Carboxyl Group-Containing Polyols—

The carboxyl group-containing polyols as a raw material of the aqueous polyurethane resin are compounds containing two or more hydroxyl groups and one or more carboxyl groups in one molecule and preferably contain a compound having two hydroxyl groups and one carboxy group in one molecule.

Examples of the carboxyl group-containing polyols include dimethylolalkanoic acids such as 2,2-dimethylolpropionic acid and 2,2-dimethylolbutanoic acid, N,N-bishydroxyethylglycine, N,N-bishydroxyethylalanine, 3,4-dihydroxybutanesulfonic acid, and 3,6-dihydroxy-2-toluenesulfonic acid. Among them, dimethylolalkanoic acids are preferable, and 2,2-dimethylolpropionic acid is more preferable, in view of availability. These may be used singly or in combination of two or more.

Further, other polyols can be used, as required, as a raw material of the aqueous polyurethane resin, other than the polyols and the carboxyl group-containing polyols. Polyols other than the polyols and the carboxyl group-containing polyols mentioned above as examples can be used as the other polyols without particular limitation.

—Polyisocyanate Compounds—

The polyisocyanate compound as a raw material of the aqueous polyurethane resin is not particularly limited, and specific examples thereof include aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenylmethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, 4,4',4''-triphenylmethane triisocyanate, m-isocyanatophenylsulfonyl isocyanate, and p-isocyanatophenylsulfonyl isocyanate; aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate; and alicyclic polyisocyanate compounds such as isophorone diisocyanate (IPDI), 4,4'-dicyclohexylmethane diisocyanate (hydrogenated MDI), cyclohexylene diisocyanate, methyl cyclohexylene diisocyanate (hydrogenated TDI), bis(2-isocyanatoethyl)-4-cyclohexene-1,2-dicarboxylate, 2,5-norbornane diisocyanate, and 2,6-norbornane diisocyanate. These polyisocyanate compounds may be used singly or in combination of two or more.

The number of isocyanate groups per molecule of the polyisocyanate compound is generally two, but a polyisocyanate having three or more isocyanate groups such as triphenylmethane triisocyanate also can be used as long as the aqueous polyurethane resin is not gelated.

Among the polyisocyanate compounds, 4,4'-diphenylene methane diisocyanate (MDI), isophorone diisocyanate (IPDI), and 4,4'-dicyclohexylmethane diisocyanate (hydrogenated MDI) are preferable, for controlling reactivity and imparting strength.

—Neutralizer—

Examples of the neutralizer include organic amines such as trimethylamine, triethylamine, triisopropylamine, tributylamine, triethanolamine, N-methyl diethanolamine, N-phenyl diethanolamine, dimethylethanolamine, diethylethanolamine, N-methylmorpholine, pyridine, and 2-(dimethylamino)-2-methyl-1-propanol; and ammonia. Among them, organic amines are preferable, tertiary amines are more preferable, and triethylamine and 2-(dimethylamino)-2-methyl-1-propanol are particularly preferable.

—Chain Extender—

Examples of the chain extender include compounds reactive with an isocyanate group, specifically, amine compounds such as ethylenediamine, 1,4-tetramethylene diamine, 2-methyl-1,5-pentane diamine, 1,4-butane diamine, 1,6-hexamethylenediamine, 1,4-hexamethylenediamine, 3-aminomethyl-3,5,5-trimethylcyclohexylamine, 1,3-bis(aminomethyl)cyclohexane, xylylenediamine, piperazine, adipoyl hydrazide, hydrazine, 2,5-dimethyl piperazine, diethylenetriamine, and triethylenetetramine; diol compounds such as ethylene glycol, propylene glycol, 1,4-butanediol, and 1,6-hexanediol; polyalkylene glycols typified by polyethylene glycol; and water. Among them, amine compounds are preferable, and ethylenediamine is more preferable. These may be used singly or in combination of two or more.

<<Acrylic Resin>>

Examples of the acrylic resin include acrylic resins obtained by copolymerizing polymerizable unsaturated carboxylic acids or anhydrides thereof, (meth)acrylic acid esters, or acrylic monomers other than (meth)acrylic acids, optionally with α-methylstyrene, vinyl acetate or the like, by polymerization methods such as emulsion polymerization, solution polymerization, and bulk polymerization.

Specific examples of polymerizable unsaturated carboxylic acids and anhydrides thereof include (meth)acrylic acid, itaconic acid, maleic acid, fumaric acid, and crotonic acid, and anhydrides thereof.

Examples of the (meth)acrylic acid esters include methyl (meth)acrylate, ethyl (meth)acrylate, butyl (meth)acrylate, 2-ethylhexyl (meth)acrylate, and 2-hydroxyethyl (meth)acrylate.

Examples of acrylic monomers other than (meth)acrylic acids include (meth)acrylamide and (meth)acrylonitrile.

<<Polyester Resin>>

Examples of the polyester resin include a polyester resin obtained by esterifying a polyester glycol having a hydroxyl group at an end with tetracarboxylic dianhydride to extend the chain.

<<Rubber Latex Resin>>

Examples of the rubber latex resin include a natural rubber latex resin having a carboxyl group and a synthetic rubber latex resin having a carboxyl group.

In the case where the aqueous resin contains a carboxyl group, the equivalent ratio of the carbodiimide group of the polycarbodiimide compound (A) to the carboxyl group of the aqueous resin is not particularly limited and is preferably 0.1 to 2.0. The ratio of 0.1 or more enables the effect of adding the carbodiimide compound (A) to be obtained, and the ratio of 2.0 or less enables the carbodiimide compound (A) not to excessively remain and to suppress the performance deterioration due to the carbodiimide compound (A) excessively remaining.

The acid value of the aqueous resin differs depending on the type and the molecular weight but is 1 to 100 mgKOH/g, preferably 5 to 70 mgKOH/g. The acid value is measured using JIS K 0070:1992.

In the case where the aqueous resin contains a carboxyl group, the "acid value" means the acid value of the solid resin content based on the carboxyl group.

In the case where 1 mol of a carbodiimide group in the polycarbodiimide compound (A) is reacted with 1 mol of a carboxyl group in the aqueous resin, the polycarbodiimide compound (A) and the aqueous resin are preferably contained in an amount satisfying formula (2) below as a measure.

Solid content (g) of polycarbodiimide compound (A)=(acid value of aqueous resin (mgKOH/g)/(56.11×1000))×carbodiimide equivalent×solid content (g) of aqueous resin    (2)

The aqueous resin composition of the present invention preferably further contains at least one selected from the group consisting of water and a hydrophilic solvent.

<Hydrophilic Solvent>

Examples of the hydrophilic solvent include polyalkylene glycol monoalkyl ethers such as ethylene glycol monomethyl ether, ethylene glycol monoethyl ether, ethylene glycol monobutyl ether, diethylene glycol monoethyl ether, diethylene glycol monobutyl ether, propylene glycol monomethyl ether, and dipropylene glycol monomethyl ether; polyalkylene glycol dialkyl ethers such as diethylene glycol dimethyl ether, triethylene glycol dimethyl ether, and dipropylene glycol dimethyl ether; polyalkylene glycol monoalkyl ether acetates such as ethylene glycol monomethyl ether acetate, ethylene glycol monoethyl ether acetate, ethylene glycol monobutyl ether acetate, diethylene glycol monoethyl ether acetate, diethylene glycol monobutyl ether acetate, propylene glycol monomethyl ether acetate, and dipropylene glycol monomethyl ether acetate; alkylene glycol diacetates such as ethylene glycol diacetate and propylene glycol diacetate; alkylene glycol monophenyl ethers such as ethylene glycol monophenyl ether and propylene glycol monophenyl ether; and monoalcohols such as propanol, butanol, hexanol, and octanol.

<Additives>

Further, the aqueous resin composition of the present invention can appropriately contain additives such as pigments, fillers, leveling agents, surfactants, dispersants, ultraviolet absorbers, antioxidants, flame retardants, and colorants, as required.

The total content of the aqueous resin and the polycarbodiimide compound (A) contained in the solid content of the aqueous resin composition is preferably 80 to 100 mass %, more preferably 85 to 100 mass %, further preferably 95 to 100 mass %.

The viscosity of the aqueous resin composition of the present invention differs depending on the type and the molecular weight but is generally preferably 20 to 500 mPa·s, more preferably 30 to 300 mPa·s. The viscosity can be measured and determined by a B-type viscometer.

[Food Packaging Container]

The food packaging container of the present invention comprises a layer formed of the aqueous resin composition. Here, the food packaging container may comprise the layer formed of the aqueous resin composition as an uppermost layer or may comprise the layer formed of the aqueous resin composition as an adhesive layer.

The food packaging container may be supplemented with additives, as required, in view of the performance or the like required in the application, as long as the effects on water resistance and adhesion are not impaired, and the safety standards applied to the food packaging container are satisfied.

The food packaging container in this description includes food utensils and food container packagings. Examples of the food utensils include bowls, plates, lunch boxes, cups, chopsticks, spoons, knives, forks, kitchen knives, cutting boards, and bowls. Examples of the food container packagings include laminate films (laminates), cups, bottles, bags, trays, capsulates, retort pouches, and wrapping films. The food packaging containers may be disposable or may be used repeatedly. Here, in the case where the food packaging containers are disposable, the food packaging containers preferably contain biodegradable plastic for reducing the burden on the environment due to disposal. Further, the foods in the food packaging containers may be solid or liquid.

<Laminate Film (Laminate)>

In the case of using the laminate film (laminate) for foods (particularly, retort foods), water resistance and adhesion are required, but it is preferable to further satisfy (i) conforming to safety (such as Food Sanitation Act and FDA), (ii) being tasteless and odorless, (iii) having sufficient heat resistance, (iv) being excellent in moisture resistance and oxygen barrier properties, (v) being capable of complete sealing by heat sealing, (vi) having suitable strength (such as seal strength, piercing, and pressure resistance).

Examples of the basic configuration of the laminate film (laminate) include a configuration of base material/adhesive layer/barrier layer/adhesive layer/sealant.

Here, examples of the base substrate include a polyethylene terephthalate stretched film (which may be hereinafter referred to as PET) and a nylon stretched film (which may be hereinafter referred to as ON).

Examples of the adhesive layer include an adhesive layer formed of the aqueous resin composition of the present invention and an adhesive layer formed of a heat sealing material.

Examples of the barrier material include an aluminum foil (which may be hereinafter referred to as AL foil), modified EVOH resin, and polyvinylidene chloride (PVDC).

Examples of the sealant include an uppermost layer formed of the aqueous resin composition of the present invention, a non-stretched film (CPP) containing a propylene-ethylene block copolymer as a main component, and a linear low-density polyethylene (LLDPE).

Specific examples of the configuration of the laminate film (laminate) include (i) PET/AL foil/CPP, (ii) PET/ON/AL foil/CPP, (iii) PET/AL foil/ON/CPP, (iv) ON/CPP, (v) PET/AL foil/uppermost layer formed of the aqueous resin composition of the present invention, (vi) PET/ON/AL foil/uppermost layer formed of the aqueous resin composition of the present invention, (vii) PET/AL foil/ON/uppermost layer formed of the aqueous resin composition of the present invention, and (viii) ON/uppermost layer formed of the aqueous resin composition of the present invention. Here, an adhesive layer formed of the aqueous resin composition of the present invention may be used as an adhesive layer between components.

As a method for producing a laminate film (laminate), a general dry lamination method in which constituent films of the laminate film (laminate) are bonded using adhesive materials can be mentioned, but a method in which a resin is extruded to be directly laminated may be adopted, for example.

The laminate film (laminate) is processed into a flat bag, a standing pouch, and the like, using a sealant as a sealing layer on the inner surface of the bag for use.

Further, the layer structure of such a laminate film (laminate) is appropriately selected according to properties required for the packaging bag, such as barrier performance for satisfying the quality retention period of foods to be packaged, size and low-temperature impact resistance that can bear the weight of the contents, and the visibility of the contents.

<Uppermost Layer>

The uppermost layer of the food packaging container of the present invention is not particularly limited as long as it is a layer formed of the aqueous resin composition of the present invention and is, for example, suitably used as a sealant present on the outermost surface of the laminate film (laminate).

<Adhesive Layer>

The adhesive layer of the food packaging container of the present invention is not particularly limited as long as it is a layer formed of the aqueous resin composition of the present invention and is, for example, suitably used as an adhesive layer (crosslinking agent) for adhesion between a polyethylene terephthalate stretched film (PET) and a nylon stretched film (ON) or an adhesive layer (crosslinking agent) for adhesion between a polyethylene terephthalate stretched film (PET) and an aluminum foil (AL foil).

EXAMPLES

Hereinafter, the present invention will be specifically described by way of Examples and Comparative Examples, but the present invention is not limited to the forms described in the examples.

(Preparation Example 1) Production of Polycarbodiimide-Containing Liquid (Crosslinking Agent 1)

100 parts by mass of dicyclohexylmethane-4,4'-diisocyanate (HMDI) and 0.5 parts by mass of a carbodiimidization catalyst (3-methyl-1-phenyl-2-phosphorene-1-oxide) were put into a reaction container with reflux tube and stirrer, followed by stirring at 190° C. for 6 hours under a nitrogen stream, to obtain isocyanate-terminated poly 4,4'-dicyclohexylmethanecarbodiimide (polymerization degree=3).

The isocyanate-terminated poly 4,4'-dicyclohexylmethanecarbodiimide obtained was confirmed to have an absorption peak due to a carbodiimide group at a wavelength of about 2150 cm$^{-1}$ by infrared absorption (IR) spectroscopy using an infrared spectrophotometer (FT/IR-6100, available from JASCO Corporation).

Then, the isocyanate-terminated poly 4,4'-dicyclohexylmethanecarbodiimide obtained above was cooled to 120° C., and 63.5 parts by mass (0.33 equivalent to the equivalent of the functional group of the total amount of the isocyanate groups at both ends of the isocyanate-terminated poly 4,4'-dicyclohexylmethanecarbodiimide) of polyethylene glycol monomethyl ether (PEGME) (average molecular weight: 1000), which is an organic compound, as an end capping agent was added thereto, followed by heating to 150° C., to allow reaction under stirring for about 1 hour. Thereafter, 3.9 parts by mass of ethylene glycol (0.67 equivalent to the equivalent of the functional group of the total amount of the isocyanate groups at both ends of the isocyanate-terminated poly 4,4'-dicyclohexylmethanecarbodiimide), which is a diol compound (glycol compound), as a chain extender was further added thereto, to allow reaction under stirring for about 1 hour.

It was confirmed by infrared absorption (IR) spectroscopy that the absorption of the isocyanate groups at a wavelength of 2200 to 2300 cm$^{-1}$ disappeared, to obtain a polycarbodiimide compound. The resultant was cooled to about 80° C., and water was put therein, to obtain a pale-yellow transparent polycarbodiimide-containing liquid (crosslinking agent 1) with a solid content of 40 mass %.

(Preparation Examples 2, 3, 3-2, 4 to 7, and 9 to 15) Production of Polycarbodiimide-Containing Liquid (Crosslinking Agents 2, 3, 3-2, 4 to 7, and 9 to 15)

Polycarbodiimide-containing liquids (crosslinking agents 2, 3, 3-2, 4 to 7, 9, and 11 to 15) were obtained in the same manner as in Preparation Example 1, except that the diisocyanate compound, the organic compound (end capping agent), the diol compound (chain extender), and the solvent were changed to the types shown in Table 1A and Table 1B.

No polycarbodiimide-containing liquid could be obtained in Preparation Example 10, since the polycarbodiimide compound did not dispersed in water (Comparative Example 9).

(Preparation Example 8) Production of Polycarbodiimide-Containing Liquid (Crosslinking Agent 8)

100 parts by mass of dicyclohexylmethane-4,4'-diisocyanate (HMDI) and 0.5 parts by mass of carbodiimidization catalyst (3-methyl-1-phenyl-2-phosphorene-1-oxide) were put into a reaction container with reflux tube and stirrer, followed by stirring at 190° C. for 10 hours under a nitrogen stream, to obtain isocyanate-terminated poly 4,4'-dicyclohexylmethanecarbodiimide (polymerization degree=8).

The isocyanate-terminated poly 4,4'-dicyclohexylmethanecarbodiimide obtained was confirmed to have an absorption peak due to a carbodiimide group at a wavelength of about 2150 cm$^{-1}$ by infrared absorption (IR) spectroscopy using an infrared spectrophotometer (FT/IR-6100, JASCO Corporation).

Then, the isocyanate-terminated poly 4,4'-dicyclohexylmethanecarbodiimide obtained above was cooled to 120° C., 84.7 parts by mass of polyethylene glycol monomethyl ether (average molecular weight: 1000) as an end capping agent was added thereto, to allow further reaction under stirring at the same temperature for 1 hour. After heating again to 150°

C. and further reaction under stirring for 5 hours, it was confirmed by infrared absorption (IR) spectroscopy that the absorption of the isocyanate groups at a wavelength of 2200 to 2300 cm$^{-1}$ disappeared, to obtain a polycarbodiimide compound. The resultant was cooled to about 80° C., and water was put therein, to obtain a pale-yellow transparent polycarbodiimide-containing liquid (crosslinking agent 8) with a solid content of 40%.

Examples 1 to 3, 3-2, and 4 to 8, and Comparative Examples 1 to 8

The polycarbodiimide-containing liquids (crosslinking agents) produced in Preparation Examples 1 to 3, 3-2, and 4 to 15 each were mixed with the aqueous resin-containing liquids shown in Table 1A and Table 1B at the compounding amounts shown in Table 1A and Table 1B, followed by stirring, to prepare aqueous resin compositions.

The details of the components shown in Table 1A and Table 1B used for preparing the aqueous resin compositions were as follows.

[Diisocyanate Compound]
  HMDI: Dicyclohexylmethane-4,4'-diisocyanate
  IPDI: Isophorone diisocyanate
  TDI: Toluene diisocyanate (mixture of 2,4-TDI (80 mass %) and 2,6-TDI (20 mass %))
  HMDI+IPDI: Mixture of dicyclohexylmethane-4,4'-diisocyanate and isophorone diisocyanate (molar ratio: 1:1)

[Diol Compound (Chain Extender)]
  EG: Ethylene glycol (molecular weight: 62.07)
  PG: Propylene glycol (molecular weight: 76.09)
  BD: 1,4-Butanediol (molecular weight: 90.12)
  PPG (2000): Polypropylene glycol (molecular weight: 2000)
  PCD (2000): Polycarbonate diol (molecular weight: 2000)
  PCLD (2000): Polycaprolactone diol (molecular weight: 2000)

[Organic Compound (End Capping Agent)]
  PEGME (550): Polyethylene glycol monomethyl ether (weight-average molecular weight: 550)
  PEGME (1000): Polyethylene glycol monomethyl ether (weight-average molecular weight: 1000)
  PEGMEHE: Polyethylene glycol mono-2-ethylhexyl ether (molecular weight: about 482)
  PEGMLE: Polyethylene glycol monolauryl ether (molecular weight: about 1066)
  HPSS: Sodium hydroxypropanesulfonate (molecular weight: 162.14)

[Solvent]
  NMP+water: Mixture of 1-methyl-2-pyrrolidone (NMP) and water (mass ratio: 1:1)

[Aqueous Resin]
  MD-1480: Aqueous polyester resin, TOYOBO CO., LTD., acid value: 3 mg/KOHmg, solid content: 25 mass %
  AC-261P: Aqueous acrylic resin, available from The Dow Chemical Company, acid value: 15 mg/KOHmg, solid content: 50 mass %

Under the measurement conditions shown below, the aqueous resin compositions prepared in Examples 1 to 3, 3-2, and 4 to 8, and Comparative Examples 1 to 8 were evaluated. Table 1A and Table 1B show the evaluation results.

<Evaluation Items>

First, the aqueous resin compositions prepared in Examples 1 to 3, 3-2, and 4 to 8, and Comparative Examples 1 to 8 were applied onto a PET substrate (thickness: 100 μm) surface-degreased with acetone using a bar coater #4, followed by drying at 120° C. for 5 minutes, to form a 3 μm dry film (coating). The coating test piece with the aforementioned coating formed was used as an evaluation sample in the following water resistance test and adhesion test.

(1) Water Resistance Test (Immediately after Taking Out and 24 Hours after Drying)

The coating test piece obtained was set in a highly accelerated lifetime tester ("EHS-210M", available from ESPEC CORP., a thermo-hygrostat; temperature: 120° C., relative humidity: 100%) for wet heat treatment for 0.5 hours.

The degree of whitening of the coating surface of the coating test piece taken out from the highly accelerated lifetime tester was observed by visual inspection immediately after taking out and 24 hours after drying and evaluated based on the evaluation criteria shown in FIG. 1 (left side: good (whitening ratio: 10% or less), center: tolerable (whitening ratio: over 10% and 50% or less), and right side: defective (whitening ratio: over 50% and 100% or less)). Table 1A and Table 1B show the results.

In Table 1A and Table 1B, the results are shown as any of good, tolerable, and defective.

(2) Adhesion Test

The adhesion test was performed according to JIS5600-5-6:1999 (cross-cut method). Specifically, eleven cuts (cut spacing of 1 mm) reaching the body (PET substrate) were made on the test surface of the coating test piece (coating test piece dried for 24 hours after wet heat treatment for 0.5 hours) subjected to the water resistance evaluation test (24 hours after drying) in (1) above, using a cutter knife, to create twenty five grids. A tape "Cellotape (H)" (available from NICHIBAN Co., Ltd., adhesion strength: 3.9 N/cm) was strongly pressure-bonded to the grid portion, and the end of the tape was peeled off at once at an angle of 45°, to evaluate the state of the grids based on the evaluation criteria (the following six-level classification of 0 to 5 in the JIS standard) shown in FIG. 2. Table 1A and Table 1B show the results of the adhesion evaluation. It can be said that the smaller the classification value, the better the adhesion of the coating.

<Evaluation Classification>

0: The edges of the cuts are completely smooth, and peeling does not occur in any square of the grid.

1: Small peeling of the coating at intersections of the cuts occurs. The peeling affecting the cross-cut portion is clearly not more than 5%.

2: The coating peels along the edges of the cuts and/or at the intersections. The peeling affecting the cross-cut portion is clearly more than 5% but not more than 15%.

3: Large peeling of the coating occurs partially or fully along the edges of the cuts, and/or various portions of the squares peel partially or fully. The peeling affecting the cross-cut portion is clearly more than 15% but not more than 35%.

4: Large peeling of the coating occurs partially or fully along the edges of the cuts, and/or the squares in several places peel partially or fully. The peeling affecting the cross-cut portion is clearly not more than 65%.

5: Any extent of peeling that cannot be classified even into the classification 4.

TABLE 1A

| | Example | | | | | | | | |
|---|---|---|---|---|---|---|---|---|---|
| | 1 | 2 | 3 | 3-2 | 4 | 5 | 6 | 7 | 8 |
| Preparation Example | 1 | 2 | 3 | 3-2 | 4 | 5 | 6 | 7 | 1 |
| Diisocyanate compound | HMDI | HMDI | HMDI | HMDI | HMDI | HMDI | IPDI | HMDI + IPDI | HMDI |
| Organic compound (end capping agent) | PEGME (1000) | PEGME (1000) | PEGME (550) | PEGME (550) | PEGME (1000) | PEGME (1000) | PEGME (1000) | PEGME (1000) | PEGME (1000) |
| Diol compound (chain extender) | EG | PG | EG | EG | EG | EG | EG | EG | EG |
| Polymerization degree of carbodiimide group ($n_1 = n_2$) | 3 | 3 | 3 | 1.85 | 4 | 3 | 3 | 3 | 3 |
| Number of urethane bond introduction units (p) | 2 | 2 | 2 | 2 | 2 | 4 | 2 | 2 | 2 |
| Carbodiimide equivalent | 542 | 545 | 442 | 580 | 461 | 455 | 488 | 515 | 542 |
| Solvent | Water | Water | Water | Water | Water | Water | Water | Water | Water |
| Compounding amount of polycarbodiimide-containing liquid (parts by mass) | 3 | 3 | 3 | 3 | 3 | 3 | 3 | 3 | 20 |
| Aqueous resin | MD-1480 | MD-1480 | MD-1480 | MD-1480 | MD-1480 | MD-1480 | MD-1480 | MD-1480 | AC-261P |
| Compounding amount of aqueous resin-containing liquid (parts by mass) | 100 | 100 | 100 | 100 | 100 | 100 | 100 | 100 | 100 |
| Water resistance test (immediately after taking out) | Good | Good | Good | Good | Tolerable | Tolerable | Tolerable | Tolerable | Good |
| Water resistance test (24 hours after drying) | Good | Good | Good | Good | Good | Good | Good | Good | Good |
| Adhesion test | 0 | 0 | 0 | 0 | 1 | 1 | 1 | 1 | 0 |

TABLE 1B

| | Comparative Example | | | | | | | | |
|---|---|---|---|---|---|---|---|---|---|
| | 1 | 2 | 3 | 4 | 5 | 6 | 7 | 8 | 9 |
| Preparation Example | 8 | 9 | 11 | 12 | 13 | 14 | 15 | 8 | 10 |
| Diisocyanate compound | HMDI | HMDI | HMDI | HMDI | IPDI | HMDI | TDI | HMDI | HMDI |
| Organic compound (end capping agent) | PEGME (1000) | PEGME (1000) | PEGME (550) | PEGMEHE | PEGMLE | HPSS | PEGME (1000) | PEGME (1000) | PEGME (1000) |
| Diol compound (chain extender) | — | EG | BD | PPG (2000) | PCD (2000) | PCLD (2000) | EG | — | EG |
| Polymerization degree of carbodiimide group ($n_1 = n_2$) | 8 | 3 | 1.5 | 4 | 10 | 4 | 3 | 8 | 3 |
| Number of urethane bond introduction units (p) | — | 1 | 2 | 1 | 1 | 3 | 2 | — | 5 |
| Carbodiimide equivalent | 501 | 649 | 678 | 654 | 407 | 679 | 424 | 501 | 434 |
| Solvent | Water | Water | Water | NMP + Water | NMP + Water | NMP + Water | Water | Water | Water |
| Compounding amount of polycarbodiimide-containing liquid (parts by mass) | 3 | 3 | 3 | 3 | 3 | 3 | 3 | 20 | — |
| Aqueous resin | MD-1480 | MD-1480 | MD-1480 | MD-1480 | MD-1480 | MD-1480 | MD-1480 | AC-261P | — |
| Compounding amount of aqueous resin-containing liquid (parts by mass) | 100 | 100 | 100 | 100 | 100 | 100 | 100 | 100 | — |
| Water resistance test (immediately after taking out) | Tolerable | Defective | Tolerable | Defective | Defective | Defective | Defective | Tolerable | — |
| Water resistance test (24 hours after drying) | Tolerable | Tolerable | Tolerable | Tolerable | Tolerable | Tolerable | Defective | Good | — |
| Adhesion test | 2 | 2 | 2 | 3 | 3 | 3 | 5 | 2 | — |

As seen from the evaluation results shown in Table 1A and Table 1B, it turned out that an aqueous resin composition capable of forming a coating (layer) having water resistance and adhesion that can withstand use for food packaging can be obtained by using the polycarbodiimide compound (A) of the present invention (Examples 1 to 3, 3-2, and 4 to 8).

Further, it is understood by comparing Example 1 with Example 4 that the polymerization degrees (n1 and n2) are preferably 3 or less.

Further, it is understood by comparing Example 1 with Example 5 that p value is preferably 3 or less.

Further, it is understood by comparing Example 1 with Examples 6 and 7 that the aliphatic diisocyanate compound is preferably dicyclohexylmethane-4,4'-diisocyanate (HMDI) rather than isophorone diisocyanate (IPDI).

Further, it is understood from Example 8 that an aqueous acrylic resin can be used as the aqueous resin.

The invention claimed is:

1. An aqueous resin composition comprising an aqueous resin, at least one selected from the group consisting of water and a hydrophilic solvent, and a polycarbodiimide compound (A) represented by formula (1) below:

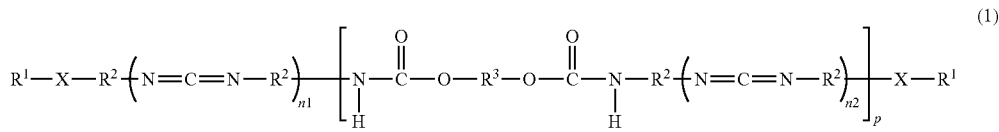

wherein $R^1$ represents a residue obtained by removing a functional group capable of reacting with isocyanate from a hydrophilic compound having the functional group capable of reacting with isocyanate, $R^2$ represents a divalent residue obtained by removing an isocyanate group from an aliphatic diisocyanate compound, and $R^3$ represents a divalent residue obtained by removing a hydroxyl group from a glycol compound having 2 or 3 carbon atoms; X represents a group that is formed by reaction between the hydrophilic compound and the aliphatic diisocyanate compound; n1 represents a number of 1 to 10, n2 represents a number of 1 to 10, and p represents a number of 2 to 4; and a plurality of $R^1$ and $R^2$ each may be the same or different, and wherein the aqueous resin is at least one selected from the group consisting of an acrylic resin and a polyester resin.

2. The aqueous resin composition according to claim 1, wherein the glycol compound is at least any one of ethylene glycol and propylene glycol.

3. The aqueous resin composition according to claim 1, wherein the diisocyanate compound is at least any one of dicyclohexylmethane-4,4'-diisocyanate and isophorone diisocyanate.

4. The aqueous resin composition according to claim 1, wherein a carbodiimide equivalent of the polycarbodiimide compound (A) is 640 or less.

5. The aqueous resin composition according to claim 1, wherein the aqueous resin contains a carboxyl group, and
an equivalent ratio of the carbodiimide group of the polycarbodiimide compound (A) with respect to the carboxyl group of the aqueous resin is 0.1 to 2.0.

6. A food packaging container comprising a layer formed of the aqueous resin composition according to claim 1.

7. The food packaging container according to claim 6, comprising the layer as an uppermost layer.

8. The food packaging container according to claim 6, comprising the layer as an adhesive layer.

* * * * *